United States Patent
Tsuboi et al.

(10) Patent No.: US 6,795,225 B2
(45) Date of Patent: Sep. 21, 2004

(54) MICROMIRROR UNIT WITH TORSION CONNECTOR HAVING NONCONSTANT WIDTH

(75) Inventors: Osamu Tsuboi, Kawasaki (JP); Satoshi Ueda, Kawasaki (JP); Yoshihiro Mizuno, Kawasaki (JP); Ippei Sawaki, Kawasaki (JP); Hisao Okuda, Kawasaki (JP)

(73) Assignees: Fujitsu Limited, Kawasaki (JP); Fujitsu Media Devices Limited, Suzaka (JP)

( * ) Notice: Subject to any disclaimer, the term of this patent is extended or adjusted under 35 U.S.C. 154(b) by 0 days.

(21) Appl. No.: 09/984,814

(22) Filed: Oct. 31, 2001

(65) Prior Publication Data

US 2003/0007262 A1 Jan. 9, 2003

(30) Foreign Application Priority Data

Jul. 4, 2001 (JP) ........................................ 2001-203152

(51) Int. Cl.[7] .............................................. G00B 26/08
(52) U.S. Cl. ...................... 359/224; 359/223; 359/225; 359/226
(58) Field of Search ................................ 359/223, 291, 359/295, 298, 225, 226

(56) References Cited

U.S. PATENT DOCUMENTS

| | | | | |
|---|---|---|---|---|
| 4,688,662 A | * | 8/1987 | Correll | ........................ 188/268 |
| 5,345,521 A | * | 9/1994 | McDonald et al. | ............ 385/19 |
| 5,774,604 A | | 6/1998 | McDonald | ..................... 385/18 |
| 5,839,692 A | * | 11/1998 | Ralph et al. | ........... 244/102 SL |
| 6,134,042 A | * | 10/2000 | Dhuler et al. | ................ 359/224 |
| 6,201,629 B1 | * | 3/2001 | McClelland et al. | ......... 359/223 |
| 6,396,975 B1 | * | 5/2002 | Wood et al. | ................... 385/18 |
| 6,543,286 B2 | * | 4/2003 | Garverick et al. | ........ 73/514.18 |

FOREIGN PATENT DOCUMENTS

| | | | | |
|---|---|---|---|---|
| DE | 3331817 A1 | * | 3/1985 | ............. F16F/1/16 |
| JP | 7-287177 | | 10/1995 | |
| JP | 9-146032 | | 6/1997 | |
| JP | 9-146034 | | 6/1997 | |
| JP | 10-62709 | | 3/1998 | |
| JP | 2000-13443 | | 1/2000 | |
| JP | 2000-214407 | | 8/2000 | |

* cited by examiner

*Primary Examiner*—Drew A. Dunn
*Assistant Examiner*—Joshua L Pritchett
(74) *Attorney, Agent, or Firm*—Armstrong, Kratz, Quintos, Hanson & Brooks, LLP

(57) ABSTRACT

A micromirror unit is provided which includes a frame, a mirror forming base upon which a mirror surface is formed, and a torsion connector which includes a first end connected to the mirror forming base and a second end connected to the frame. The torsion connector defines a rotation axis about which the mirror forming base is rotated relative to the frame. The torsion connector has a width measured in a direction which is parallel to the mirror surface and perpendicular to the rotation axis. The width of the torsion connector is relatively great at the first end. The width becomes gradually smaller from the first end toward the second end.

14 Claims, 11 Drawing Sheets

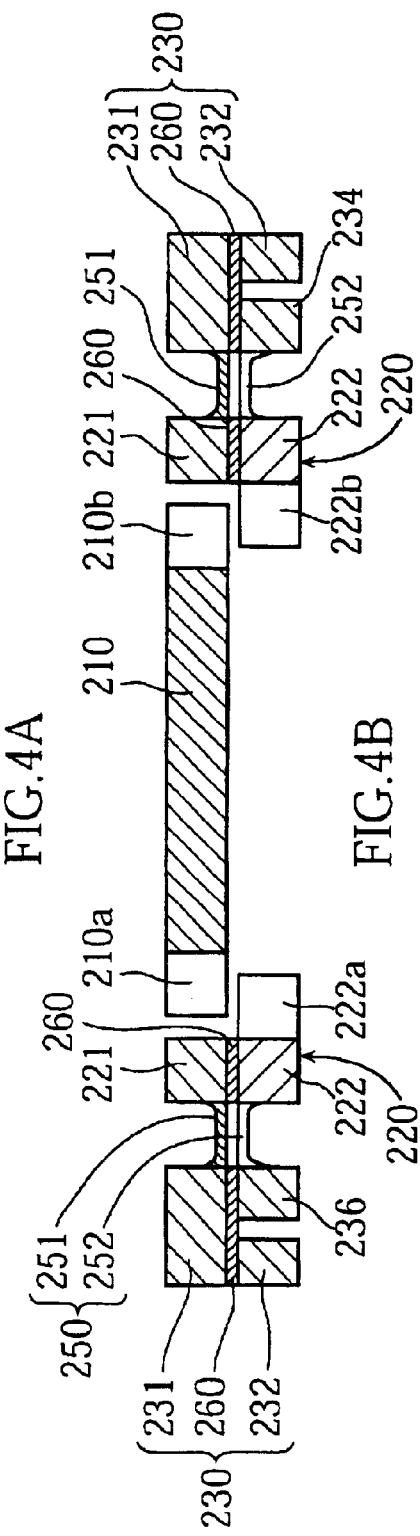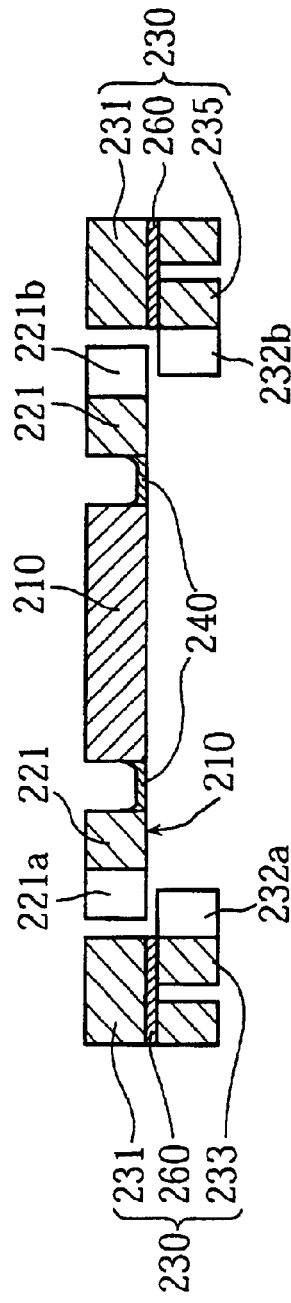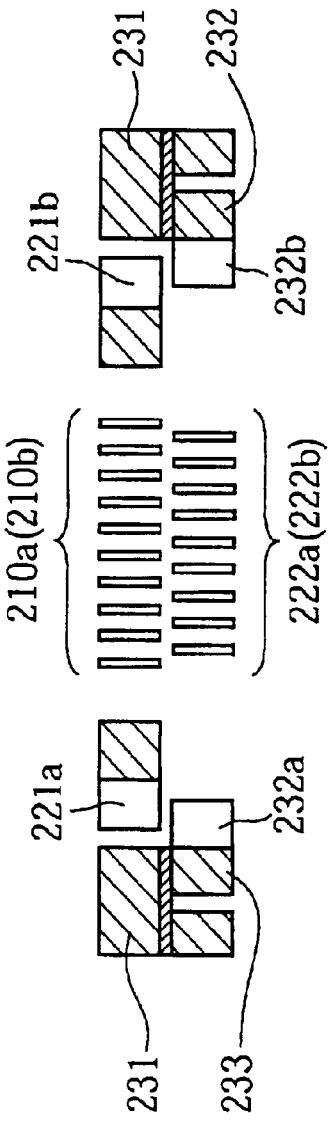

MICROMIRROR UNIT WITH TORSION CONNECTOR HAVING NONCONSTANT WIDTH

BACKGROUND OF THE INVENTION

1. Field of the Invention

The present invention relates to a micromirror unit used in optical apparatus for the purposes of changing the direction of light. In particular, it relates to a micromirror unit of the type which is advantageously incorporated in an optical disk apparatus (for writing to or reading data from an optical disk), an optical switching apparatus (for selectively connecting one optical fiber to another to provide a light passage), etc.

2. Description of the Related Art

A micromirror unit is provided with a reflective mirror member which is pivotable for changing the direction of reflected light. A popular technique for actuating the mirror member is to utilize electrostatic force. Micromirror units of this type (referred to as "static driving type" hereinafter) may have several structures. Such micromirror units are generally classified into two groups, depending on fabrication methods. One of the methods employs a "surface micro-machining" technique, whereas the other employs a "bulk micro-machining" technique.

In accordance with the surface micro-machining, patterned material layers in lamination may be formed on a base substrate, thereby providing required components such as a support, a mirror member and electrodes. In this layer forming process, a dummy layer (or sacrificial layer), which will be removed later, may also be formed on the substrate. A conventional micromirror unit of the static driving type by the surface micro-machining is disclosed in JP-A-7(1995)-287177 for example.

In accordance with the bulk micro-machining, on the other hand, a base substrate itself is subjected to etching, thereby providing required components such as a frame and a mirror forming base. Then, a mirror member and electrodes may be formed on the etched substrate by a thin-film forming technique. Micromirror units of the static driving type by the bulk micro-machining are disclosed in JP-A-9 (1997)-146032, JP-A-9-146034, JP-A-10(1998)-62709 and JP-A-2000-13443.

One of the technically significant factors desired in a micromirror unit is a high flatness of the reflective mirror member. According to the above-mentioned surface micro-machining technique, however, the thickness of the resulting mirror member is rendered very small, so that the mirror member is liable to warp. To avoid this and ensure a high flatness, the mirror member should be made so small that its respective edges are less than 100 μm in length. In accordance with the bulk micro-machining, on the other hand, a rather thick substrate is processed, thereby providing a sufficiently rigid mirror forming base to support the mirror member. Thus, a relatively large mirror member having a high flatness can be obtained. Due to this advantage, the bulk micro-machining technique is widely used to fabricate a micromirror unit having a large mirror member whose edges are more than 100 μm in length.

FIG. 10 of the accompanying drawings shows an example of conventional micromirror unit fabricated by the bulk micro-machining technique. The illustrated micromirror unit 400 is of the static driving type, and includes a lamination of a mirror substrate 410 and a base substrate 420. As shown in FIG. 11, the mirror substrate 410 includes a mirror forming base 411 and a frame 413. The mirror forming base 411 has an obverse surface upon which a mirror member 411a is formed. The mirror forming base 411 is supported by the frame 413 via a pair of torsion bars 412. The mirror forming base 411 has an reverse surface upon which a pair of electrodes 414a and 414b is formed. As shown in FIG. 10, the base substrate 420 is provided with a pair of electrodes 421a and 421b which faces the above-mentioned pair of electrodes 414a and 414b of the mirror forming base 411.

With the above arrangement, the electrodes 414a, 414b of the mirror forming base 411 may be positively charged, whereas the electrode 421a of the base substrate 420 may be negatively charged. As a result, an electrostatic force is generated between these electrodes, thereby turning the mirror forming base 411 in the N3-direction shown in FIG. 10 as the torsion bars 412 are being twisted. The rotation angle of the mirror forming base 411 is determined by the balance between the inter-electrode electrostatic force and the restoring force of the twisted torsion bars 412. To rotate the mirror forming base 411 in the opposite direction, the other electrode 421b of the substrate 420 may be negatively charged. As readily understood, when the mirror forming base 411 is turned clockwise or counterclockwise, as required, the light reflected on the mirror member 411a is directed in the desired direction.

As noted above, the mirror forming base 411 is rotated through an angle which is defined by the balance between the inter-electrode electrostatic force and the restoring force of the twisted torsion bars 412. Thus, it is possible to adjust the rotation angle of the base 411 by controlling the static electricity to be generated in correlation with the restoring force of the torsion bars 412.

Generally, a micromirror unit is a structure whose minimum dimension is about several hundred micrometers. This is rather large size, and therefore the restoring force of the torsion bars tends to exceed the inter-electrode electrostatic force in strength. Thus, conventionally, the area of each electrode is rendered large (for generating a great electrostatic force), whereas each torsion bar is made uniformly thin along its length (for weakening the restoring force). In the prior art micromirror unit 410 (FIG. 11), each torsion bar 412 has a constant small width L along the entire length.

In the above manner, however, the mirror forming base 411 is supported by the thin torsion bars 412. Accordingly, it is difficult to hold the mirror forming base 411 stable (i.e., nonrotatable) about the normal N3 (the line at right angles to the surface). If unstable about the normal N3, the mirror forming base 411 is liable to unduly swivel about the normal N3 when the base 411 is supposed to rotate only about the axis defined by the torsion bars 412. When such an unwanted swivel occurs, it is difficult or even impossible to precisely control the operation of the micromirror unit.

SUMMARY OF THE INVENTION

The present invention has been proposed under the circumstances described above. It is, therefore, an object of the present invention to provide a micromirror unit which does not suffer from the above-noted problems. Specifically, an object of the present invention is to provide a micromirror unit which is provided with torsion bars of reduced restoring force and still can exert excellent stability against undesired swiveling.

According to a first aspect of the present invention, there is provided a micromirror unit which includes: a first frame; a mirror forming base provided with a mirror surface; and a first torsion connector which includes a first end connected to the mirror forming base and a second end connected to the first frame. The torsion connector defines a first axis about which the mirror forming base is rotated relative to the first frame. The torsion connector has a width measured in a direction which is parallel to the mirror surface and perpendicular to the first axis. The width of the first torsion connector is relatively great at the first end and becomes gradually smaller from the first end toward the second end.

In a preferred embodiment, a micromirror unit further includes a second frame and a second torsion connector. The second torsion connector connects the second frame to the first frame and defines a second axis about which the first frame and the mirror forming base are rotated relative to the second frame.

In another preferred embodiment, the second torsion connector has a width measured in a direction which is parallel to the mirror surface and perpendicular to the second axis, wherein the width of the second torsion connector is relatively great at a connecting portion to the first frame, and becomes gradually smaller from the first frame toward the second frame.

Preferably, the first torsion connector may include a plurality of torsion bars.

Preferably, a micromirror unit may further include a first potential conducting path and a second potential conducting path, wherein each of the torsion bars is connected to one of the first and the second potential conducting paths.

Preferably, the width of the first torsion connector becomes monotonically smaller from the first end to the second end.

In a preferred embodiment, the first torsion connector includes an intermediate point between the first end and the second end. The width of the first torsion connector becomes monotonically smaller from the first end to the intermediate point and becomes monotonically greater from the intermediate point to the second end.

Preferably, the first torsion connector has a rectangular cross section or a circular cross section or an elliptical cross section.

Preferably, the first torsion connector has a hollow structure.

Preferably, the first torsion connector includes a bifurcating portion.

Preferably, the first torsion connector may include, in at least one of the first end and the second end, a curved portion for prevention of stress concentration.

In a preferred embodiment, the mirror forming base is provided with a first comb-teeth electrode, while the first frame is provided with a second comb-teeth electrode cooperating with the first comb-teeth electrode for moving the mirror forming base.

Preferably, a micromirror unit may further include a support base facing the mirror forming base. The support base is provided with a first electrode facing the mirror forming base, while the mirror forming base is provided with a second electrode facing the first electrode.

Preferably, the mirror forming base may be provided with a first electromagnetic coil, and the support base may be provided with a second electromagnetic coil or a permanent magnet facing the first electromagnetic coil.

Preferably, the mirror forming base may be provided with a permanent magnet, and the support base may be provided with an electromagnetic coil facing the permanent magnet.

Preferably, at least a part of the first frame may have a multi-layer structure including a plurality of conductive layers and an insulating layer disposed between the conductive layers.

Preferably, the first frame may be provided with a third comb-teeth electrode, and the second frame may be provided with a fourth comb-teeth electrode cooperating with the third comb-teeth electrode for moving the first frame and the mirror forming base.

According to a second aspect of the present invention, there is provided a micromirror unit which includes: an inner frame; an outer frame; a mirror forming base provided with a mirror surface; an inner torsion connector connecting the inner frame to the mirror forming base; and an outer torsion connector which connects the inner frame to the outer frame and defines an axis about which the inner frame and the mirror forming base are rotated relative to the outer frame. The outer torsion connector has a width measured in a direction which is parallel to the mirror surface and perpendicular to said axis. The width of the outer torsion connector is relatively great at a connecting portion to the inner frame, and becomes gradually smaller from the inner frame and to the outer frame.

Other features and advantages of the present invention will become apparent from the detailed description given below with reference to the accompanying drawings.

BRIEF DESCRIPTION OF THE DRAWINGS

FIG. 4A is a sectional view taken along lines A—A in FIG. 3A or 3B;

FIG. 4B is a sectional view taken along lines B—B in FIG. 3A or 3B;

FIG. 4C is a sectional view taken along lines C—C in FIG. 3A or 3B;

DETAILED DESCRIPTION OF THE PREFERRED EMBODIMENT

The preferred embodiments of the present invention will be described below with reference to the accompanying drawings.

Figure 1:
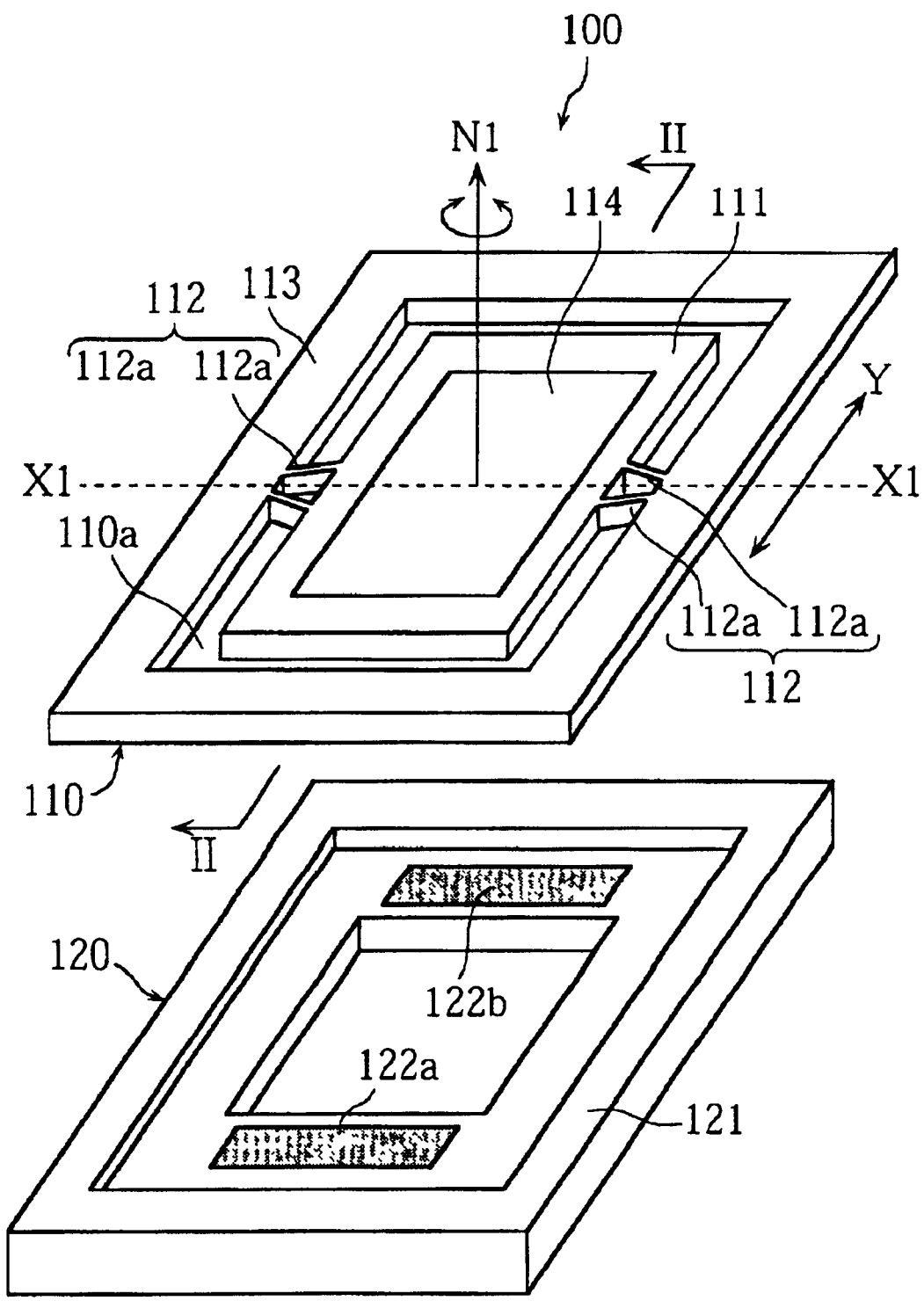
FIG. 1 is an exploded view showing a micromirror unit according to a first embodiment of the present invention.
Figure 2:
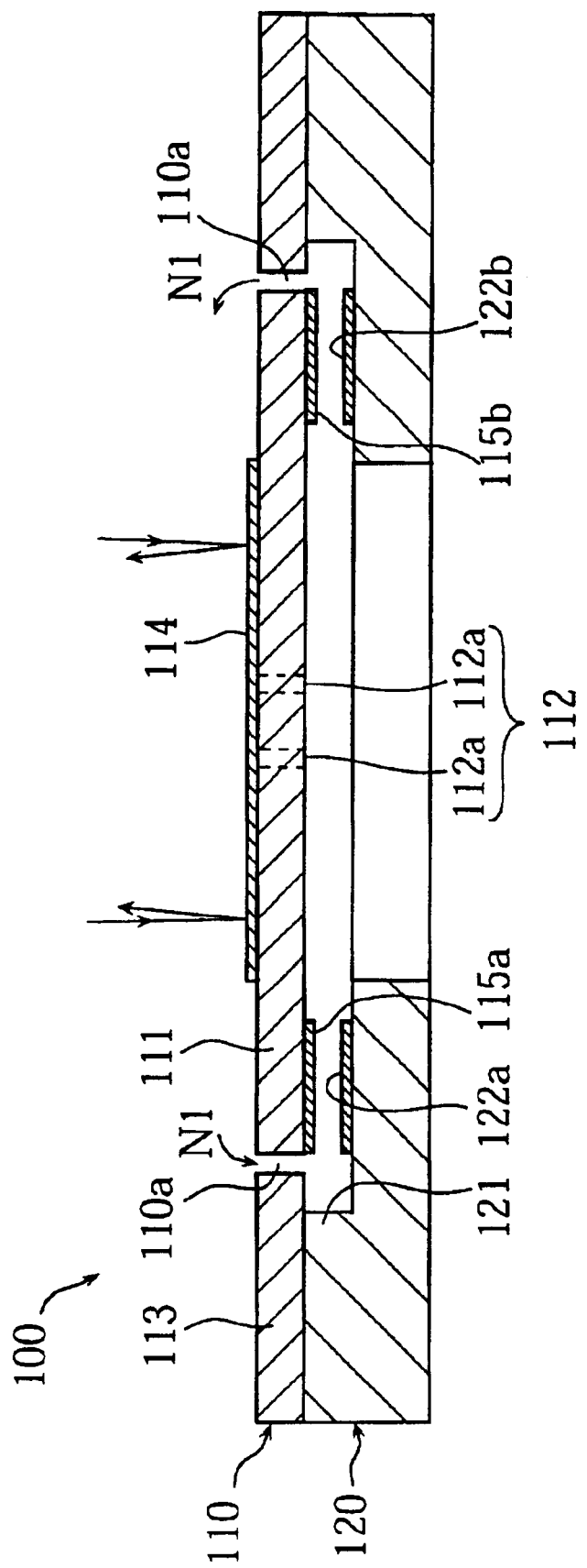
FIG. 2 is a sectional side view showing the assembled state of the micromirror unit of FIG. 1.

FIGS. 1 and 2 show a micromirror unit 100 according to a first embodiment of the present invention. The illustrated unit 100 is a "static driving type" device, and includes two superposed substrates, i.e., a mirror substrate 110 and a base substrate 120.

As shown in FIG. 1, the mirror substrate 110 includes a mirror forming base 111, a frame 113 around the base 111, and a pair of torsion connectors 112 connecting the base 111 to the frame 113. The mirror substrate 110 may be made of a conductive silicon material doped with n-type impurity (such as phosphorous or arsenic) or p-type impurity (e.g. boron) The mirror substrate 110 may be fabricated by a bulk micro-machining technique. Specifically, first a plate of conductive silicon substrate is prepared. Then, for forming several openings 110a (see the figure), portions of the silicon plate that correspond to the mirror forming base 111, the frame 113 and the torsion connectors 112 are covered by an etching mask. Finally, the masked silicon plate is subjected to Si etching (by Deep RIE) or wet Si etching (by KOH). The thus formed openings 110a define the configurations of the mirror forming base 111, the frame 113 and the torsion connectors 112. In the illustrated example, each opening 110a (between the mirror forming base 111 and the frame 113) has a width ranging from 10 μm to 200 μm for example, while the thickness of the mirror forming base 111 and frame 113 ranges from 10 μm to 200 μm.

As shown in FIG. 2, the obverse surface of the mirror forming base 111 is provided with a mirror member 114, while its reverse surface is provided with a pair of electrodes 115a, 115b. The mirror member 114 and the electrodes 115a, 115b may be made by vapor deposition of metal. The electrodes 115a, 115b may be omitted when the conductivity of the mirror substrate 110 is sufficiently high (this can be achieved by doping the mirror substrate 110 with impurities).

As shown in FIG. 1, each of the torsion connectors 112 is integrally connected, at one end, to the center of a longitudinal side surface of the mirror forming base 111, and at the other end, to the center of an inner longitudinal side surface of the frame 113. This structure makes the micromirror unit 100 of the preferred embodiment a single-axis type device in which the paired torsion connectors 112 define a rotation axis X1. In the illustrated embodiment, each torsion connector 112 includes two torsion bars 112a. These two torsion bars 112a define the 'width' of the torsion connector 112, where the 'width' refers to the dimension measured in the Y-direction shown in FIG. 1. By this definition, the torsion connector 112 has a relatively great width of 30~300 μm at its inner end (where the connector 112 is fixed to the base 111), and becomes narrower gradually from the mirror forming base 111 toward the frame 113. At the narrowest portion (where the connector 112 is fixed to the frame 113), the torsion connector 112 has a width of 1~30 μm.

As shown in FIG. 2, the frame 113 is attached to the upwardly protruding rim 121 of the base substrate 120. The base substrate 120 is provided with a pair of electrodes 122a, 122b which face the electrodes 115a, 115b of the mirror forming base 111. This makes the micromirror unit 100 a "parallel electrode type" device.

With the above arrangement, the electrodes 115a, 115b of the mirror forming base 111 may be positively charged, while the electrode 122a of the base substrate 120 may be negatively charged. As a result, an electrostatic force is generated between these electrodes, thereby turning the mirror forming base 111 in the N1-direction against the restoring force of the paired torsion connectors 112. To turn the mirror forming base 111 in the opposite direction, the electrode 122b may be negatively charged. As the mirror forming base 111 is turned clockwise or counterclockwise, the light reflected on the mirror member 114 can be directed in a desired direction.

In the preferred embodiment, the mirror forming base 111 is smoothly turned about the axis X1 (FIG. 1) with application of an advantageously small driving voltage. This is because each torsion connector 112 has a mechanically weaker portion (narrower portion) against the twisting force acting on the mirror forming base 111. At the same time, each torsion connector 112 is connected to the mirror forming base 111 at its maximum width portion. Thus, the swiveling of the base 111 about the normal N1 is properly prevented.

The positive potential is applied to the electrodes 115a, 115b of the mirror forming base 111 via the frame 113, torsion connectors 112 and mirror forming base 111, all of which are integrally made of conductive material. In this way, it is possible to apply the necessary potential to the electrodes 115a, 115b on the mirror forming base 111 without providing an additional wiring pattern on the torsion connectors 112 and other elements. On the other hand, the negative potential is applied to the electrodes 122a, 122b of the base substrate 120 via a wiring pattern (not shown) formed on the base substrate 120. The base substrate itself is made of insulating material.

Instead of using the above-described parallel electrode strategy, use may be made of comb-teeth electrodes for actuating the mirror forming base 111 of the micromirror unit 100. Also, instead of using electrostatic force, use may be made of an attracting or repelling force that results from permanent magnets or electromagnets. Specifically, each of the electrodes 115a, 115b on the mirror forming base 111 may be replaced by an electromagnetic coil, while each of the electrodes 122a, 122b on the base substrate may be replaced by an electromagnetic coil or permanent magnet. Alternatively, each of the electrodes 115a, 115b on the mirror forming base 111 may be replaced by a permanent magnet, while each of the electrodes 122a, 122b on the base substrate may be replaced by an electromagnetic coil. In these arrangements, it is possible to control the rotation of the mirror forming base 111 by varying the potential applied to the electromagnetic coil.

Figure 3A:
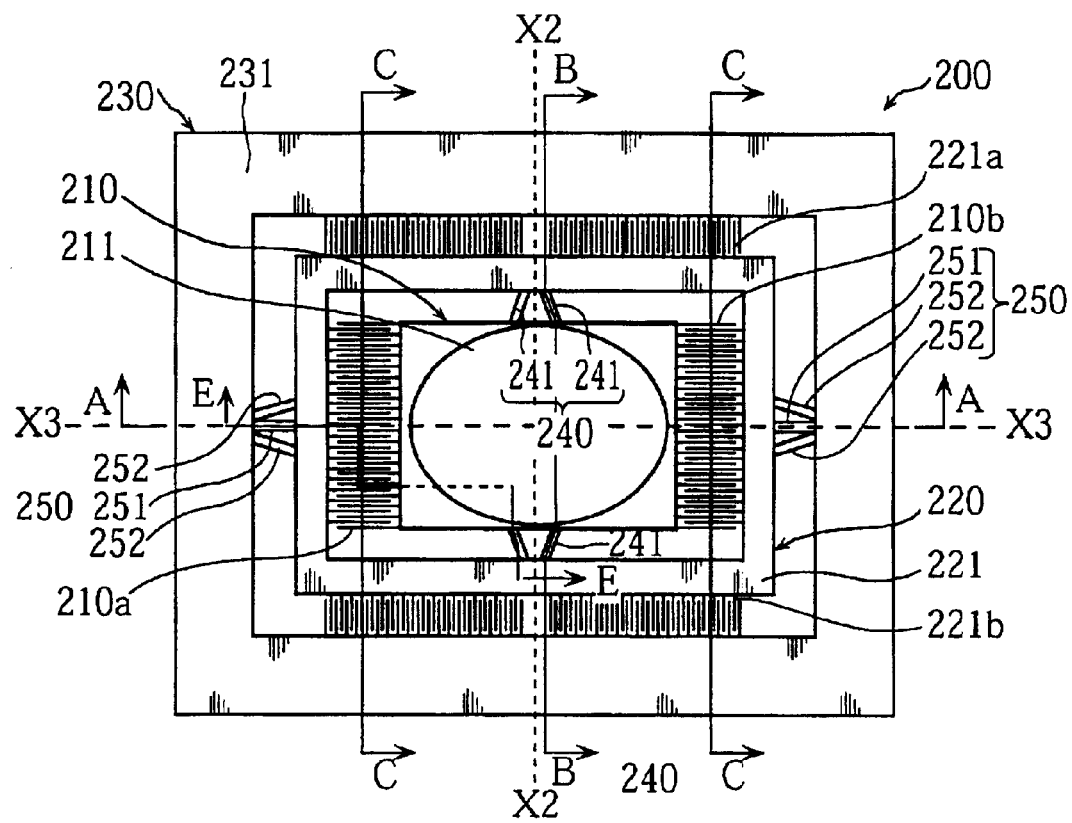
FIG. 3A is an upper plan view showing a micromirror unit according to a second embodiment of the present invention.
Figure 3B:
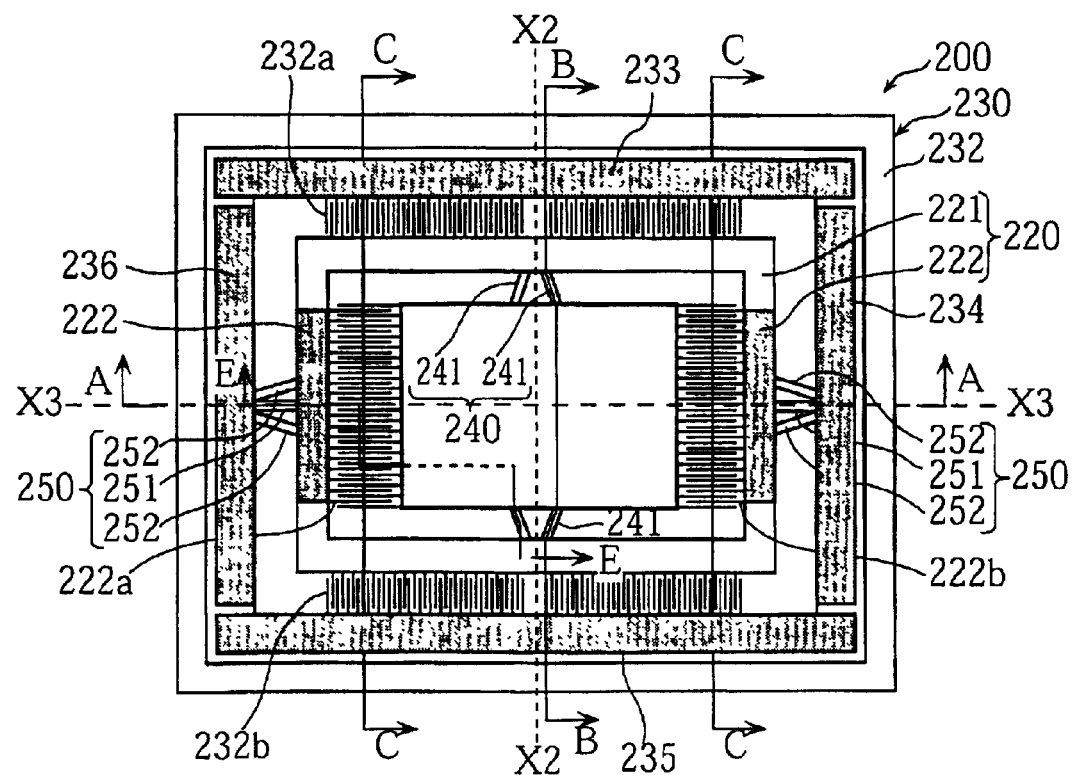
FIG. 3B is a lower plan view showing the micromirror unit of FIG. 3A.

Reference is now made to FIGS. 3A–3B and 4A–4C illustrating a micromirror unit 200 according to a second embodiment of the present invention. The upper view of the unit 200 is shown in FIG. 3A, while the bottom view is shown in FIG. 3B. FIGS. 4A, 4B and 4C are sectional views taken along lines A—A, B—B and C—C in FIG. 3, respectively.

As shown in FIGS. 3A and 3B, the micromirror unit 200 of the second embodiment includes a mirror forming base 210, an inner frame 220 surrounding the base 210, an outer frame 230 surrounding the inner frame 220, a pair of first torsion connectors 240 connecting the mirror forming base 210 to the inner frame 220, and a pair of second torsion connectors 250 connecting the inner frame 220 to the outer frame 230. The first torsion connectors 240 have a first rotation axis X2 about which the mirror forming base 210 is rotated with respect to the inner frame 220. The second torsion connectors 250 have a second rotation axis X3 about which the inner frame 220 is rotated with respect to the outer frame 230. In the illustrated embodiment, the first axis X2 is perpendicular to the second axis X3. All the components of the micromirror unit 200 are made of a conductive material except a mirror member 211 and an insulating layer 260, as will be described below. The conductive material may be a semiconductor (e.g. Si) doped with n-type impurity (e.g. phosphorous or arsenic) or p-type impurity (e.g. boron). Alternatively, a metal (tungsten) may be used for the conductive material.

As shown in FIG. 3A, the mirror forming base 210 is a rectangular plate, having an upper surface upon which a thin reflective layer (mirror member) 211 is provided. The mirror forming base 210 has two relatively long side surfaces and two relatively short side surfaces. The mirror forming base 210 is provided with two sets of first comb-teeth electrodes 210a, 210b extending outward from the shorter side surfaces of the mirror forming base 210.

The inner frame 220, as shown in FIGS. 3B and 4, includes a frame body 221 and a pair of electrode bases 222. Each of the electrode base 222 is attached to the frame body 221 with an insulating layer 260 intervening therebetween for electrical insulation. The electrode bases 222 are provided with second comb-teeth electrodes 222a or 222b extending inward. The frame body 221 is provided with third comb-teeth electrodes 221a, 221b extending outward. As best shown in FIG. 4A, the second comb-teeth electrodes 222a, 222b are disposed under the first comb-teeth electrodes 210a or 210b. In addition, as shown in FIG. 4C, the first comb-teeth electrodes 210a (or 210b) are horizontally offset from the second comb-teeth electrodes 222a (or 222b) so that they will not interfere when the mirror forming base 210 is caused to pivot about the first torsion connectors 240.

As shown in FIG. 3A or 3B, each first torsion connector 240 includes two bifurcating torsion bars 241. In this instance again, the width of the torsion connector 240, that is defined by these two torsion bars 241, becomes gradually smaller from the mirror forming base 210 toward the inner frame 220. Specifically, the greatest width of the connector 240 (the portion connected to the mirror forming base 210) may be in a range of 30~300 $\mu$m , while the smallest width of the connector 240 (the portion connected to the inner frame 220) may be in a range of 1~30 $\mu$m. As shown in FIG. 4B, the torsion bars 241 are smaller in thickness than the mirror forming base 210 and the inner frame 220.

As best shown in FIG. 4A, the outer frame 230 includes a first or upper frame member 231 and a second or lower frame member 232. The first and the second frame members 231, 232 are electrically insulated from each other by an insulating layer 260 disposed between the two frame members. As shown in FIG. 3B, the second frame member 232 is provided with a first auxiliary strip (or first island) 233, a second auxiliary strip (or second island) 234, a third auxiliary strip (or third island) 235 and a fourth auxiliary strip (or fourth island) 236. The first to the fourth islands 233–236 are spaced from each other for electrical insulation. As shown in FIGS. 3B and 4B, the first island 233 and the third island 235 are formed integral with fourth comb-teeth electrodes 232a, 232b extending inward. The fourth comb teeth electrodes 232a, 232b are located below and laterally offset from the third comb-teeth electrodes 221a, 222b. With such an offset, the third comb-teeth electrodes 221a, 221b do not interfere with the fourth comb-teeth electrodes 222a, 222b even when the inner frame 220 is turned.

As shown in FIGS. 3A and 3B, the second torsion connectors 250 each include one central torsion bar 251 and two nonparallel, outer torsion bars 252. The width of each connector 250 is defined by the outer torsion bars 252. The greatest value of the width may be 30~300 $\mu$m, while the smallest value of the width may be 1~30 $\mu$m. As shown in FIG. 4A, the torsion bars 251 and 252 are smaller in thickness than the inner and the outer frames 220, 230. The central torsion bar 251 bridges between the body 221 of the inner frame 220 and the first frame member 231 of the outer frame 230. The other torsion bars 252 bridge between the electrode base 222 of the inner frame 220 and the second frame member 232 of the outer frame 230.

With the above arrangements, when a potential is applied to the upper frame member 231, the effect is conducted to the first comb-teeth electrodes 210a–210b and the third comb-teeth electrodes 221a–221b via the torsion bars 251, the inner frame body 221, the first torsion connectors 240 or four torsion bars 241 and the mirror forming base 210. As a result, the first comb-teeth electrodes 210a, 210b and the third comb-teeth electrodes 221a, 221b are held at the same potential. In this state, when the second comb-teeth electrodes 222a, 222b are charged to a desired potential, an electrostatic force is generated between the first comb-teeth electrodes 210a or 210b and the second comb-teeth electrodes 222a or 222b. As a result, the mirror forming base 210 is turned about the rotation axis X2. Likewise, when the fourth comb-teeth electrodes 232a, 232b are charged to a desired potential, an electrostatic force is generated between the third comb-teeth electrodes 221a or 221b and the fourth comb-teeth electrodes 232a or 232b. As a result, the inner frame 220 together with the mirror forming base 210 is turned about the rotation axis X3.

As seen from FIG. 4A, the application of potential to the second comb-teeth electrodes 222a is performed through the fourth island 236, the torsion bar 252 connected to the island 236, the torsion bar 252 connected to the island, and the relevant one of the electrode bases 222. Likewise, the application of potential to the second comb-teeth electrodes 222b is performed through the second island 234, the torsion bar 252 connected to the island, and the electrode base 222. As seen from FIG. 4B, the application of potential to the fourth comb-teeth electrodes 232a is performed through the first island 233. Likewise, the application of potential to the fourth comb-teeth electrodes 232b is performed through the third island 235. Since the four islands 233–236 are electrically insulated from each other, the required potential can be applied selectively to the second comb-teeth electrodes 222a, 222b or the fourth comb-teeth electrodes 232a, 232b. Accordingly, the mirror forming base 210 and hence the mirror member 211 can be directed in a desired direction.

In the above-described second embodiment again, the mirror forming base 210 can be properly turned about a predetermined axis due to a relatively narrow portion of the first or second torsion connector 240 or 250. At the same time, the undesired swiveling of the mirror forming base 210 about the normal (not shown) is prevented due to the flaring configuration of the first and the second torsion connectors 240, 250.

Referring now to FIGS. 5A–5H and 6A–6E, a fabrication method of the micromirror unit 200 of FIG. 3 will be described below. FIGS. 5A–5H and 6A–6E are sectional views taken along lines E—E in FIG. 3.

Figure 5A:
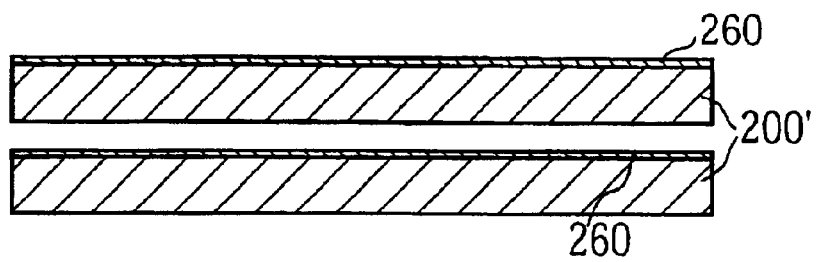
FIGS. 5A–5H and 6A–6E are sectional views, showing a fabrication method of the micromirror unit of FIG. 3, which are taken along lines E—E in FIG. 3A or 3B.

First, as shown in FIG. 5A, two conductive plates 200' are prepared. These plates may be a silicon wafer doped with n-type impurity such as arsenic or p-type impurity such as boron. Preferably, the doped wafer may have a resistivity of 0.01–0.1 Ω·cm. Each of the conductive plates 200' has its upper surface covered by a silicon dioxide layer 260 of 500 nm thickness. This layer may be formed by thermal oxidation.

Figure 5B:
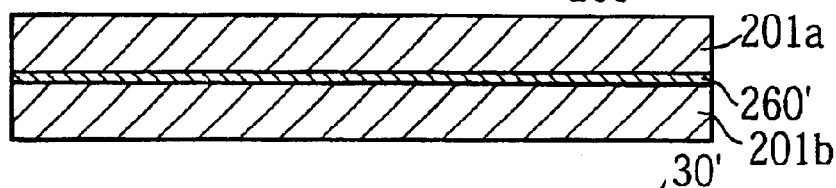

Then, as shown in FIG. 5B, the two plates 200' are fixed to each other with their silicon dioxide layers 260 held in contact. The fixation may be achieved by annealing under nitrogen atmosphere with an annealing temperature of about 1100° C. Then, the attached plates 200' are subjected to grinding so that each of them has a thickness of 100 $\mu$m. As a result, an SOI (Silicon on Insulator) assembly is obtained, which consists of the upper Si layer 201a (100 $\mu$m in thickness), the SiO$_2$ insulator 260' (1 $\mu$m in thickness) and the lower Si layer 201b (100 $\mu$m in thickness).

Figure 5C:
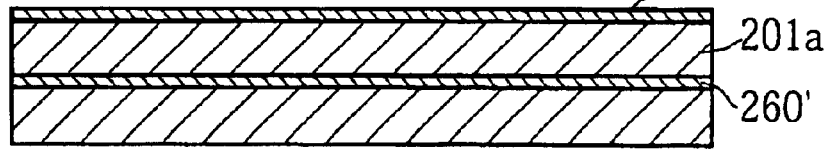

Then, as shown in FIG. 5C, the exposed surface of the upper Si layer 201a is covered by a silicon dioxide layer 30' to produce a first etching mask. The thickness of the layer 30' may be 100–1000 nm. At this stage, though not shown in the figure, the exposed surface of the lower Si layer 201b may also be covered by the same $SiO_2$ layer. As is obvious to the person skilled in the art, the layer 30' may be made of other materials than silicon dioxide, as long as the alternative material can serve proper masking function when the Si layer 201a is subjected to the etching processes by Deep RIE. The layer forming technique may be thermal oxidation, CVD (chemical vapor deposition), etc.

Figure 5D:
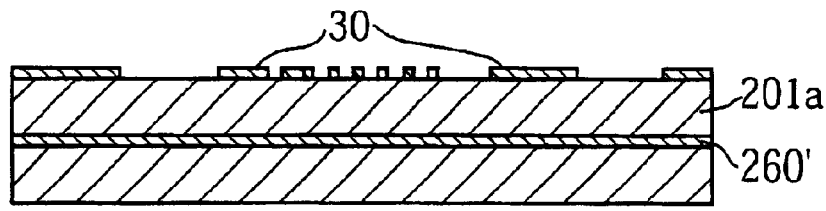
Figure 7A:
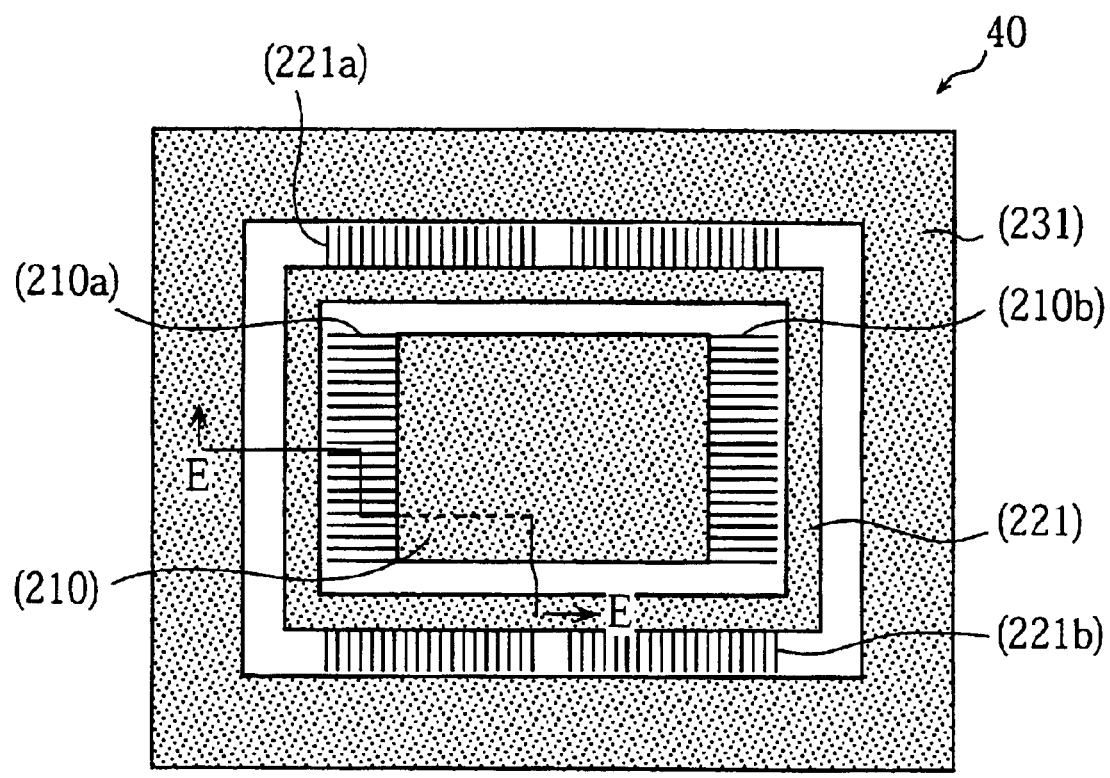
FIGS. 7A and 7B are plan views showing the configuration of pattern-forming masks used for the fabrication procedure shown in FIG. 5.

Then, as shown in FIG. 5D, the $SiO_2$ layer 30' is etched away in the prescribed portions to provide a first mask 30. The patterning for the mask 30 is performed with the use of a first mask pattern 40 shown in FIG. 7A. The configuration of the first mask pattern 40 corresponds to the layout of the principal components of the micromirror unit 200, such as the mirror forming base 210, the first comb-teeth electrodes 210a–210b, the inner frame body 221, the third comb-teeth electrodes 221a–221b, and the upper frame member 231 of the outer frame 230. The patterning of the layer 30' may be performed by wet etching (using hydrogen fluoride solution) or dry etching (using $CHF_3$ gas, $C_4F_8$ gas, etc.)

Figure 5E:
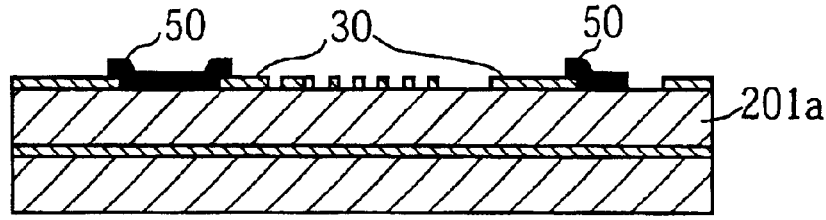
Figure 7B:
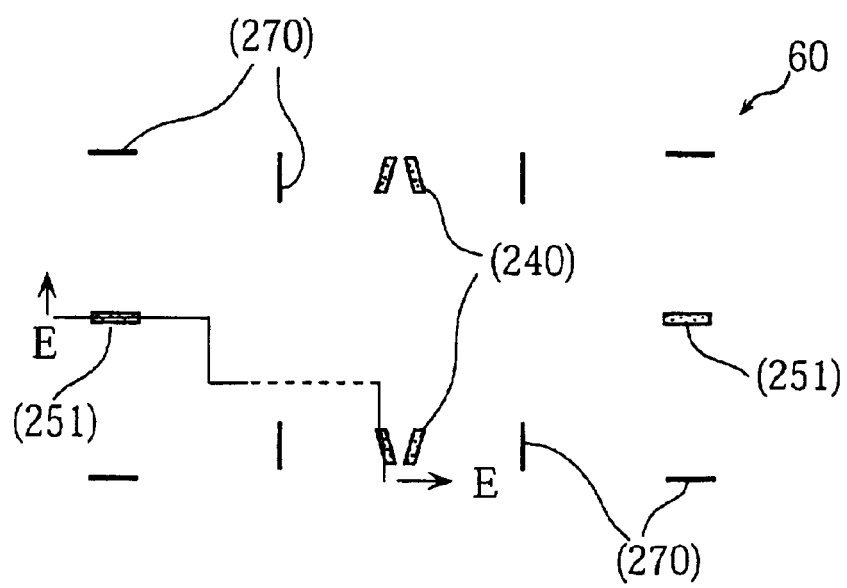

Then, as shown in FIG. 5E, a second mask 50 is formed on the upper Si layer 201a. To this end, though not shown in the figure, a photoresist layer, from which the mask 50 is produced, is formed on the upper Si layer 201' and then etched into the prescribed pattern. The thickness of the photoresist layer maybe 0.5–50 μm. Use may be made of an $Si_3N_4$ layer in place of the photoresist layer. The layer forming method may be thermal oxidation or CVD for example. The etching of the photoresist layer is performed with the use of a second mask pattern 60 shown in FIG. 7B. The configuration of the second mask pattern 60 corresponds to the first torsion connectors 240 (four torsion bars 241), the torsion bars 251 and support beams 270. In the illustrated embodiment, a set of four support beams 270 is provided for connecting the inner frame 220 to the mirror forming base 210, and another set of four support beams 270 is provided for connecting the inner frame 220 to the outer frame 230. The support beams 270 serve to alleviate stress concentration at the first and the second torsion connectors in the midst of fabricating the micromirror unit. The etching with the use of the second pattern 60 may be performed by photo etching, wet etching (using HF solution) or dry etching (using $CHF_3$ gas or $C4F_8$ gas). This etching should be performed under conditions that do not etch away the first mask pattern 30.

Figure 5F:
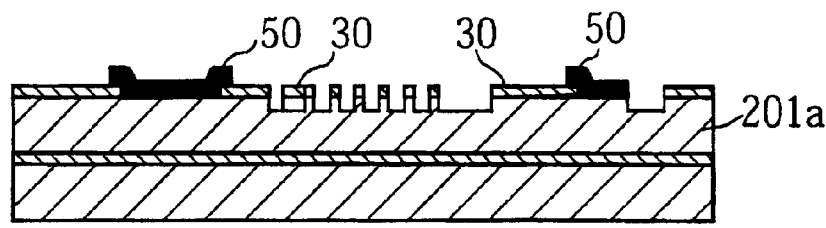

Then, as shown in FIG. 5F, the upper Si plate 201a is subjected to a first etching process by Deep RIE using $SF_6$ gas and $C_4F_8$ gas. This first etching is continued until a predetermined etching depth (say, 5 μm) is achieved in the surface of the upper Si plate 201a. Instead of the Deep RIE, wet etching using KOH solution may be employed.

Figure 5G:
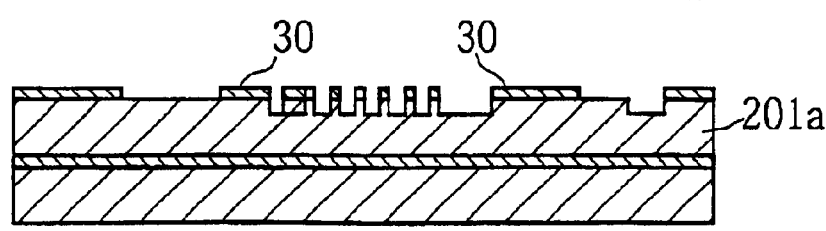

Then, as shown in FIG. 5G, the second mask pattern 50 is removed by the application of an organic solvent or by exposure to oxygen plasma. The organic solvent should be reactive on the second mask pattern 50 but (substantially) nonreactive on the first mask pattern 30. Examples of such organic solvent are tripropylene glycol methyl ether, aminoethyl ethanolamine, phosphoric acid aqueous solution, or a mixture of monoethanolamine and dimethyl sulfoxide. For instance, when the first mask pattern 30 is made of $SiO_2$ and the second mask pattern 50 is made of $Si_3N_4$, use may be made of phosphoric acid aqueous solution for the selective removal of the second mask pattern 50 only (i.e., the first mask pattern 30 remains).

Figure 5H:
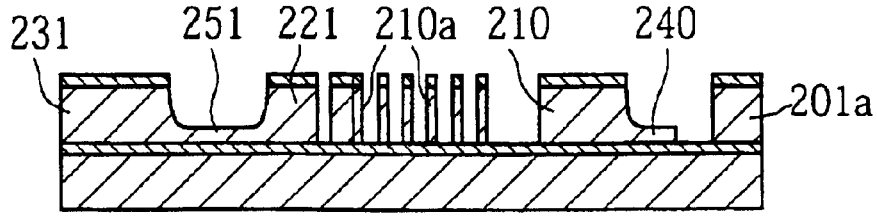

Then, as shown in FIG. 5H, a second etching process is performed, with only the first mask pattern 30 present, by Deep RIE using $SF_6$ gas and $C_4F_8$ gas. This etching process is continued until an etching depth of 95 μm is achieved in the upper Si plate 201a. If necessary, an over-etching is performed for an additional depth (e.g. 1 μm) to compensate for a processing error.

With the above described steps, the upper Si plate 201a is formed with components or elements which correspond to the mirror forming base 210 of the micromirror unit 200, the first comb-teeth electrodes 210a–210b, the inner frame body 221, the third comb-teeth electrodes 221a–221b, the upper frame member 231, the first torsion connectors 240, the torsion bars 251, and the total of eight support beams 270. Since the second etching process is performed by Deep RIE, the torsion bars 241 and 251 are rendered nonuniform in thickness so that their ends are provided with a curved portion serving the prevention of stress concentration.

Figure 6A:
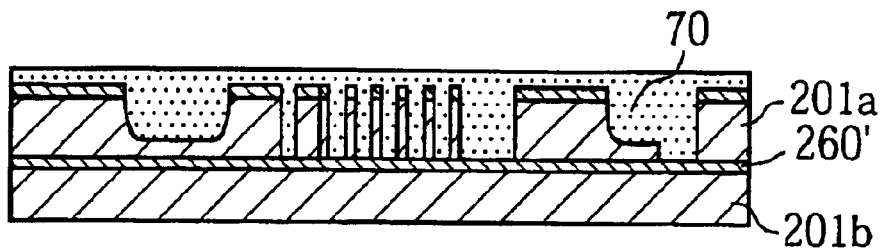

Following the second etching step shown in FIG. 5H, a protection coating forming step is carried out, as shown in FIG. 6A. The protection coating or sacrificial coating 70 encloses the components formed in the upper Si plate 201a, so that these components will not be broken during the subsequent steps of the fabrication procedure. The protection coating 70 may be formed by applying molten glass to the upper plate 201a and then annealing the glass material. Instead of a glass material, a commercially available resist material such as AZ or TSCR may be applied to the upper Si plate 201a to form a protection coating. It is also possible to stick a film sheet to the plate 201a. In light of the controllability of adhesion timing, the film sheet may preferably be made of a UV material which cures upon exposure to ultraviolet light.

After the protection coating 70 is formed, the lower Si plate 201b is processed in the following manner.

Figure 8A:
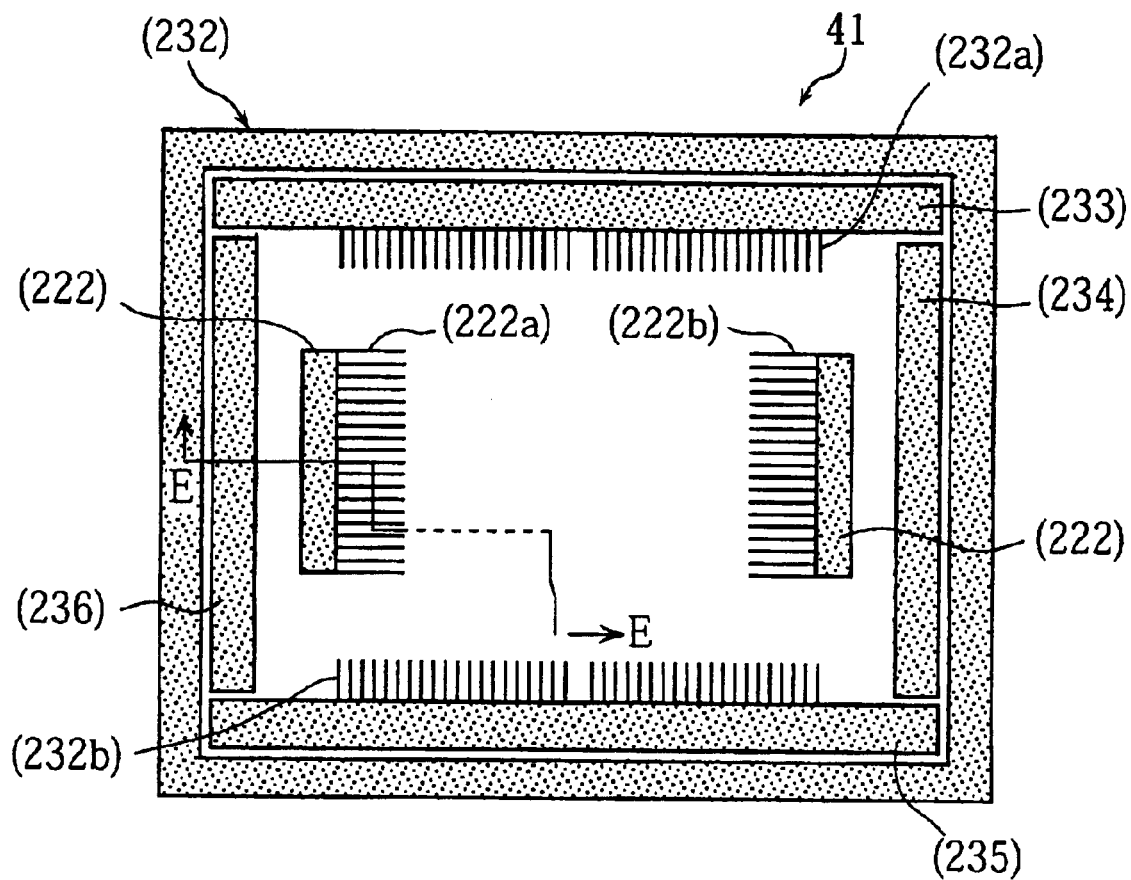
FIGS. 8A and 8B are plan views showing the configuration of pattern-forming masks used for the fabrication procedure shown in FIG. 6.

First, though not shown in the figures, a third etching mask layer is formed on the exposed surface (lower surface in FIG. 6A) of the lower Si plate 201b. The third etching mask layer is made of silicon dioxide and has a thickness of 100–1000 nm. Then, the third layer is etched to provide a third mask pattern 31. This etching is performed with the use of a third mask 41 shown in FIG. 8A. The configuration of the third mask 41 corresponds to the paired electrode bases 222, the second comb-teeth electrodes 222a–222b, the first through the fourth auxiliary strips 233–236, and the fourth comb-teeth electrodes 232a–232b.

Figure 6B:
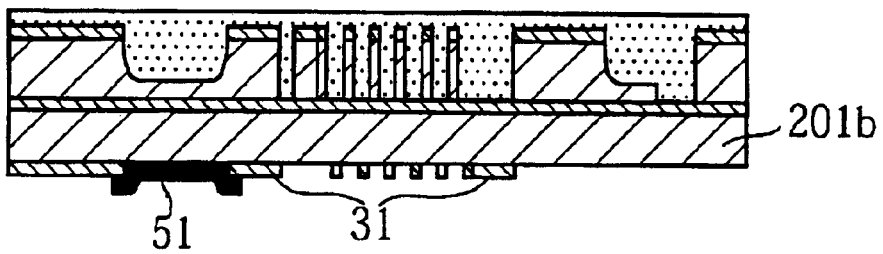
Figure 8B:
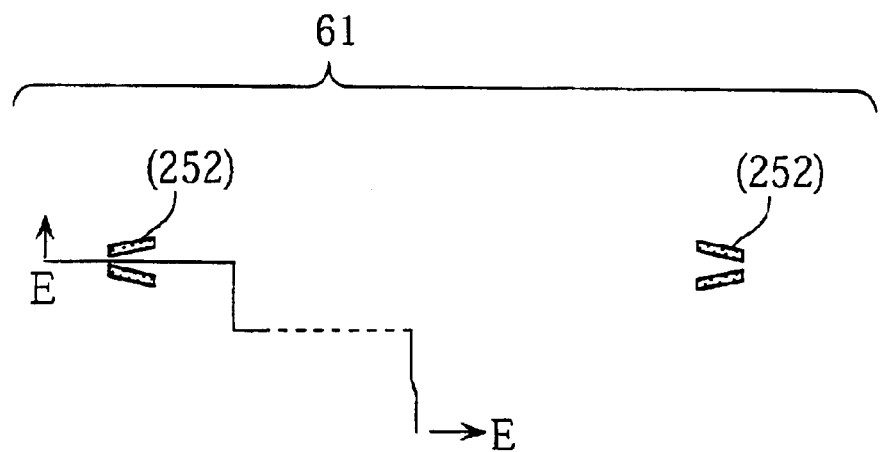

Then, as shown in FIG. 6B, a fourth mask pattern 51 is formed on the lower Si plate 201b. The fourth mask pattern 51 is made by forming a fourth etching mask layer (photoresist layer) on the lower Si plate 201b, and then etching this layer into the predetermined pattern with the use of a mask 61 shown in FIG. 8B. The thickness of the fourth etching mask layer may be 0.5–50 μm.

Figure 6C:
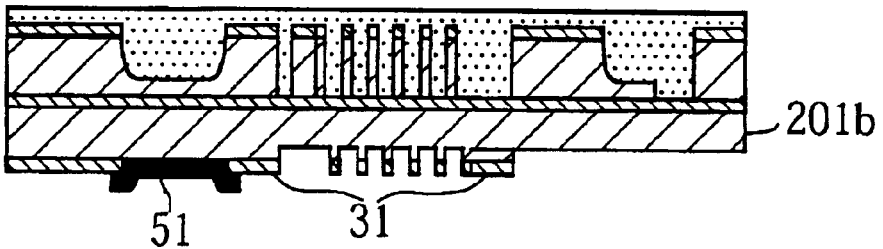

Then, as shown in FIG. 6C, the lower Si plate 201b is subjected to a first etching process. The first etching is performed by Deep RIE with the use of $SF_6$ gas and $C_4F_8$ gas. The etching process is continued until a desired etching depth (say 5 μm) is attained.

Figure 6D:
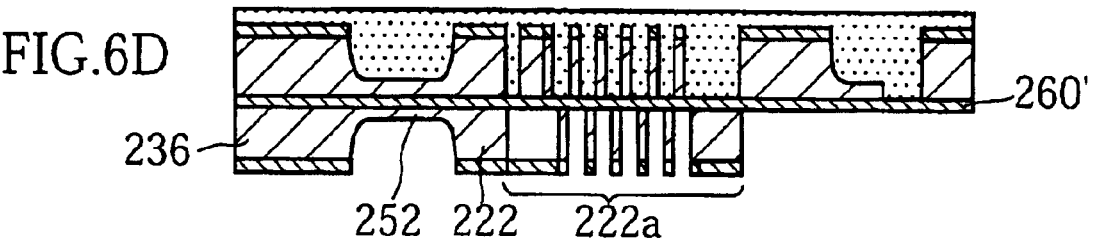

Then, the fourth mask pattern 51 is removed by the application of an organic solvent or by exposure to oxygen plasma, while the third mask pattern 31 remains intact. Thereafter, as shown in FIG. 6D, the lower Si plate 201b is subjected to a second etching process. The second etching is performed by Deep RIE using $SF_6$ gas and $C_4F_8$ gas, and is continued until a desired etching depth (say 95 μm) is attained. If necessary, an over-etching is carried out for an additional depth (e.g. 1 μm) to compensate for a processing error.

With the above steps, the lower Si plate 201b is formed with components or elements which correspond to the electrode bases 222, the second comb-teeth electrodes 222a–222b, the lower frame member 232 of the outer frame 230, the fourth comb-teeth electrodes 232a–232b, and four torsion bars 252.

Figure 6E:
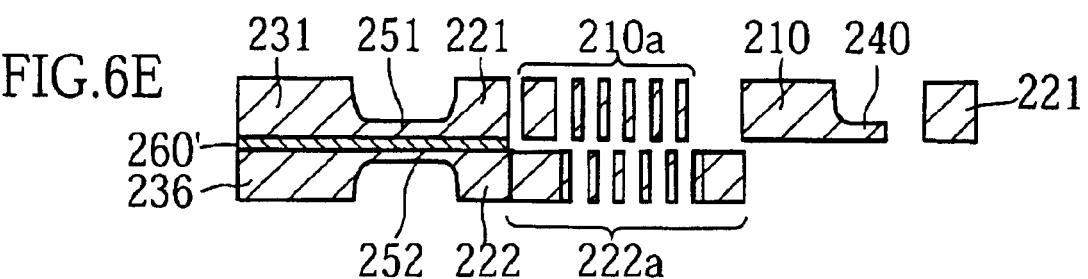

Then, as shown in FIG. 6E, the first mask pattern 30, the third mask pattern 31 and the prescribed portions of the insulating layer 260 are removed by wet etching for example. Thereafter, though not shown in the figures, a micromirror unit is cut out from the processed plate assembly, with the support beams 270 still attached. The removal of the support beams 270 may be performed thermally or mechanically. For example, each support beam 270 is formed with a cut at a prescribed portion by irradiating laser beams, and then is blown away. Instead, an electric current may be caused to pass through the support beam 270, to generate Joule heat for melting the support beam.

In the fabrication method described above, the mirror member 211 may be formed before the first step shown in FIG. 5A is initiated. The mirror member 211 may be made in the following manner. First, a titanium layer (50 nm in thickness) is formed in a prescribed area corresponding to the resulting mirror forming base 210. Then, a gold layer (500 nm in thickness) is formed on the titanium layer. Finally, the titanium-gold layer assembly is subjected to etching to be made into a prescribed configuration. The thus obtained mirror member 211 is reflective and electrically conductive. Therefore, electrical connection to the support plate (typically silicon wafer) can be made via the mirror member 211. Thus, if necessary, a connection wire can be bonded to the mirror member 211.

In the above embodiment, a substrate material is formed with an opening on one hand, and a bridging portion remains in the substrate on the other. To achieve this, a first etching process and a second etching process are performed. In the first etching process, the first and the second mask patters are used, so that the substrate material is etched away until the predetermined thickness of the bridging portion is attained. Then, a second etching process is performed with the use of only the first mask pattern as a mask. As a result, the substrate material, two components are connected to each other via only the bridging portion.

According to the present invention, a torsion connector may be made in various forms, as shown in FIGS. 9A–9I. In each figure, a plan view (left) and a sectional view (right) are shown. The sectional view is taken along two-headed arrow lines.

Figure 9A:
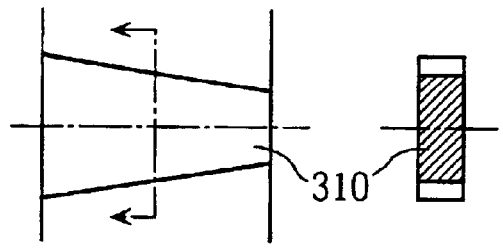
FIGS. 9A–9I show, in plan and section, examples of torsion connectors adoptable in a micromirror unit embodying the present invention.

Specifically, referring to FIG. 9A, the torsion connector includes only one torsion bar 310. As illustrated, the torsion bar 310 has a relatively wide left end and a relatively narrow right end. From left to right, the torsion bar 310 becomes monotonically smaller in width. The maximum value of the width may be in a range of 30~300 μm, while the minimum value of the width may be in a range of 1~30 μm. As only partly shown in the sectional view, the torsion bar 310 is solid throughout its entire length.

When the torsion bar 310 is used in a micromirror unit of the first embodiment for example, the left end of the bar 310 is connected to the mirror forming base 111, whereas the right end is connected to the frame 113. The same connecting manner holds for the other torsion connectors shown in FIGS. 9B–9I.

Figure 9F:
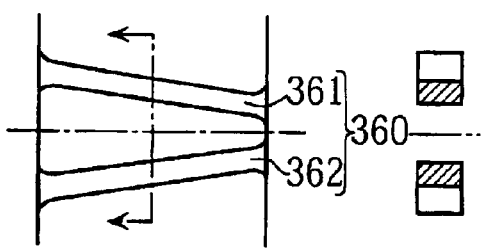
Figure 9B:
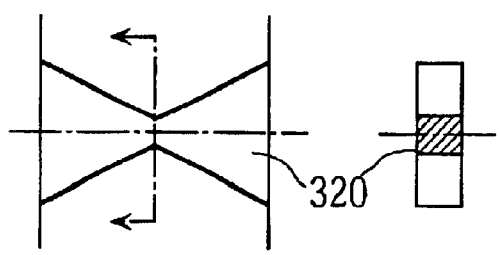

Referring to FIG. 9B, the torsion connector also includes only one torsion bar 320. The torsion bar 320 is the smallest in width (1~30 μm for example) at its intermediate point, but is the greatest in width (30~300 μm for example) at its right and left ends. As proceeding from the left end to the intermediate point, the width of the torsion bar 320 becomes monotonically smaller, while it becomes monotonically greater from the intermediate point to the right end.

Figure 9G:
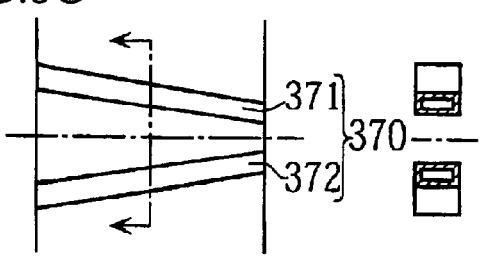
Figure 9C:
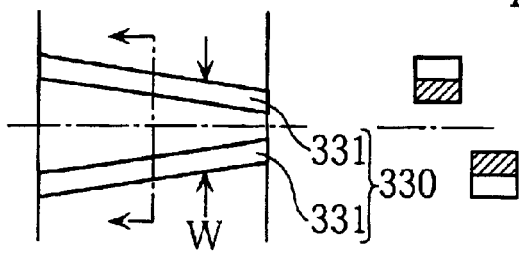

Referring to FIG. 9C, the torsion connector 330 includes two nonparallel torsion bars 331, 332. The connector's width (W), which is defined by the torsion bars 331–332, becomes gradually smaller from the left end to the right end. As seen from the accompanying sectional view, the two torsion bars 331, 332 are offset from each other in the thickness direction of a micromirror unit. When used in the micromirror unit 200 of the second embodiment, one torsion bar 331 may connect the inner frame 221 to the first (upper) frame member 231, while the other torsion bar 332 may connect the electrode base 222 to the second (lower) frame member 232.

Figure 9H:
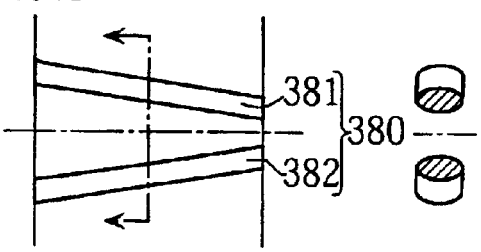
Figure 9D:
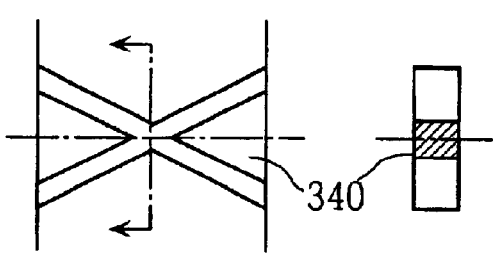

Referring to FIG. 9D, the torsion connector 340 is made in a bifurcating form resembling a letter X. As proceeding from the left end to the midpoint, the width of the connector 340 becomes gradually smaller, but from the midpoint to the right end, it becomes gradually greater.

Figure 9I:
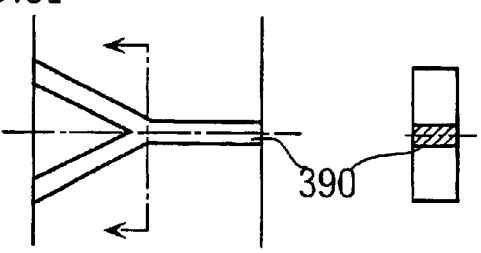
Figure 9E:
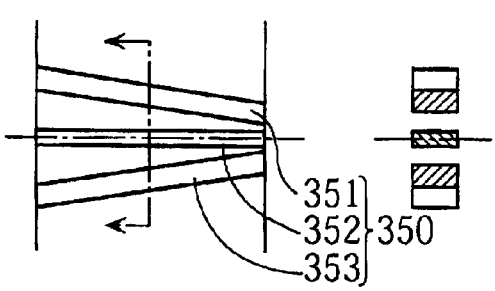
Figure 10:
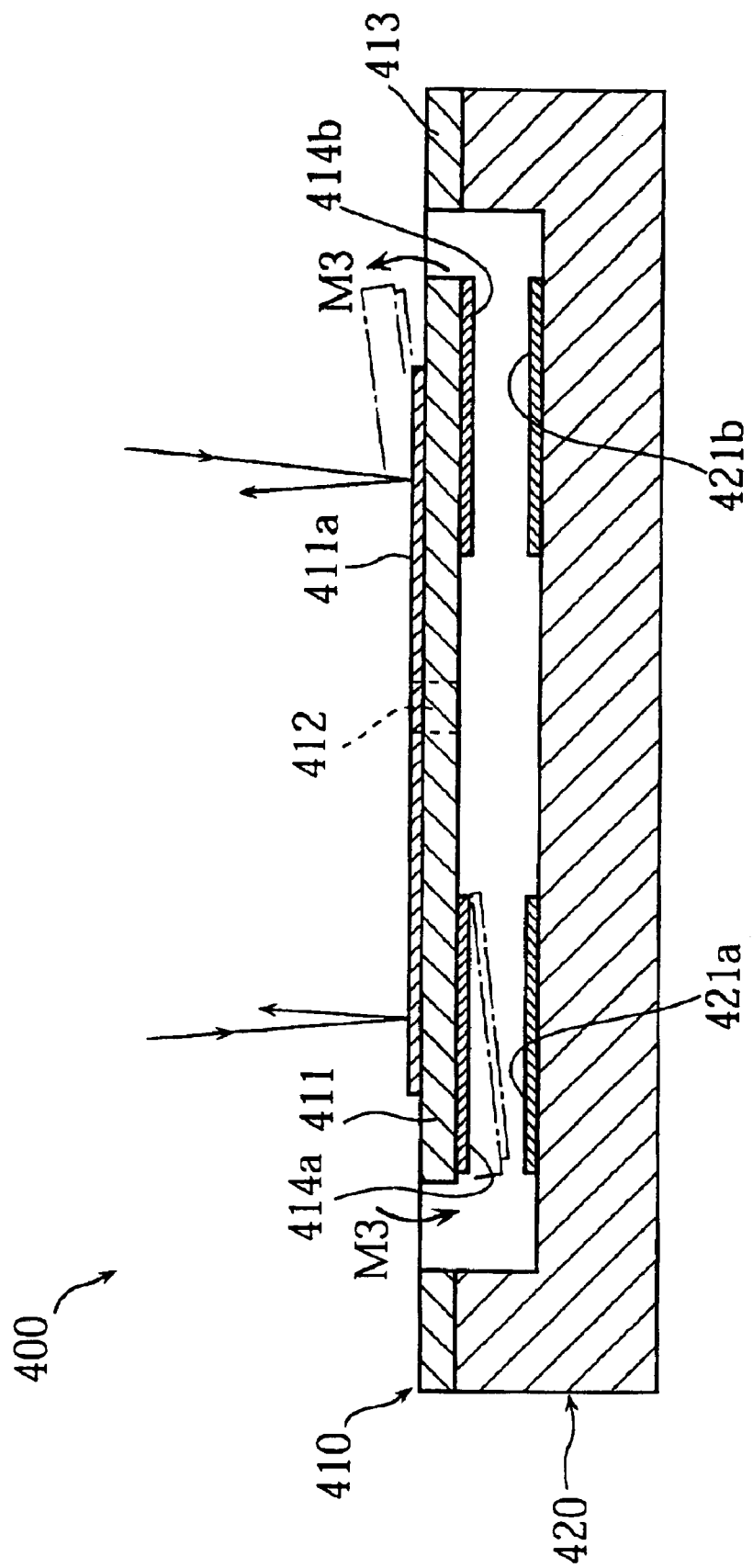
FIG. 10 is a sectional view showing a conventional micromirror unit.
Figure 11:
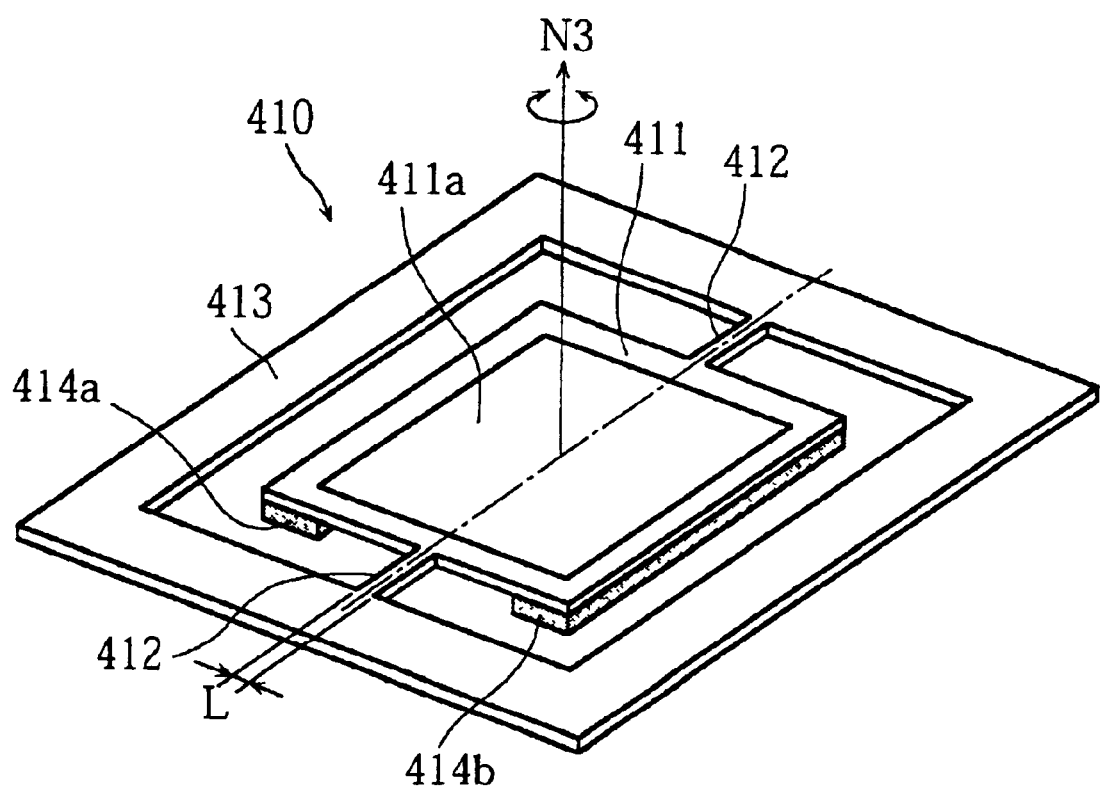
FIG. 11 is a perspective view showing the conventional micromirror unit of FIG. 10.

Referring to FIG. 9E, the torsion connector 350 includes three torsion bars 351, 352 and 353. The central bar 352 is connected to the objects at right angles. The outer bars 351 and 353 are nonparallel to each other and to the central bar 352. As in the torsion connector 330 (FIG. 9C), the connector 350 as a whole tapers from left to right.

Referring to FIG. 9F, the torsion connector 360 includes two torsion bars 361 and 362. Each of the torsion bars 361, 362 is provided with flaring right and left ends for preventing stress concentration at the connecting portion of the torsion bar to the object.

Referring to FIG. 9G, the torsion connector 370 includes two torsion bars 371 and 372. As seen from the accompanying sectional view, each of the torsion bars 371, 372 has an empty space inside.

Referring to FIG. 9H, the torsion connector 380 includes two torsion bars 381 and 382. As seen from the accompanying sectional view, each of the torsion bars 381, 382 has an elliptical cross section.

Referring to FIG. 9I, the torsion connector 390 is made in a bifurcating form resembling a letter Y. The width of the torsion connector 390 becomes gradually smaller from the left end to an intermediate point (the junction of three branches). Between the intermediate point and the right end, the torsion connector 390 has a constant width.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A micromirror unit comprising:
   a first frame;
   a mirror forming base provided with a mirror surface and spaced from the first frame to define a clearance therebetween; and
   a first torsion connector which includes a first end connected to the mirror forming base and a second end connected to the first frame, the torsion connector defining a first axis about which the mirror forming base is rotated relative to the first frame, the torsion connector having a width measured in a direction which is parallel to the mirror surface and perpendicular to the first axis, the first torsion connector being accommodated in said clearance between the first frame and the mirror forming base;

wherein the width of the first torsion connector is relatively great at the first end and becomes gradually smaller from the first end toward the second end; and wherein the first torsion connector includes an intermediate point between the first end and the second end, the width of the first torsion connector becoming monotonically smaller from the first end to the intermediate point and monotonically greater from the intermediate point to the second end.

2. The micromirror unit according to claim 1, further comprising a second frame and a second torsion connector, wherein the second torsion connector connects the second frame to the first frame and defines a second axis about which the first frame and the mirror forming base are rotated relative to the second frame.

3. The micromirror unit according to claim 2, wherein the second torsion connector has a width measured in a direction which is parallel to the mirror surface and perpendicular to the second axis, the width of the second torsion connector being relatively great at a connecting portion to the first frame, the width of the second torsion connector becoming gradually smaller from the first frame toward the second frame.

4. The micromirror unit according to claim 2, wherein the first frame is provided with a third comb-teeth electrode, and the second frame is provided with a fourth comb-teeth electrode cooperating with the third comb-teeth electrode for moving the first frame and the mirror forming base.

5. The micromirror unit according to claim 1, wherein the first torsion connector includes a plurality of torsion bars connected to a same side of the mirror forming base.

6. The micromirror unit according to claim 5, further comprising a first potential conducting path and a second potential conducting path, wherein each of the torsion bars is connected to one of the first and the second potential conducting paths.

7. The micromirror unit according to claim 1, wherein the first torsion connector has one of a rectangular cross section, a circular cross section and an elliptical cross section.

8. The micromirror unit according to claim 1, wherein the first torsion connector has a hollow structure.

9. The micromirror unit according to claim 1, wherein the mirror forming base is provided with a first comb-teeth electrode and the first frame is provided with a second comb-teeth electrode cooperating with the first comb-teeth electrode for moving the mirror forming base.

10. The micromirror unit according to claim 1, further comprising a support base facing the mirror forming base, wherein the support base is provided with a first electrode facing the mirror forming base, and the mirror forming base is provided with a second electrode facing the first electrode.

11. The micromirror unit according to claim 1, further comprising a support base facing the mirror forming base, wherein the mirror forming base is provided with a first electromagnetic coil, and the support base is provided with a selected one of a second electromagnetic coil and a permanent magnet, the selected one facing the first electromagnetic coil.

12. The micromirror unit according to claim 1, further comprising a support base facing the mirror forming base, wherein the mirror forming base is provided with a permanent magnet, and the support base is provided with an electromagnetic coil facing the permanent magnet.

13. The micromirror unit according to claim 1, wherein at least a part of the first frame has a multi-layer structure including a plurality of conductive layers and an insulating layer disposed between the conductive layers.

14. A micromirror unit comprising:

an inner frame;

an outer frame spaced from the first frame to define a clearance therebetween;

a mirror forming base provided with a mirror surface;

an inner torsion connector connecting the inner frame to the mirror forming base; and an outer torsion connector which includes a first end connected to the inner frame and a second end connected to the outer frame, the outer torsion connector defining an axis about which the inner frame and the mirror forming base are rotated relative to the outer frame, the outer torsion connector having a width measured in a direction which is parallel to the mirror surface and perpendicular to said axis the outer torsion connector being accommodated in said clearance between the inner frame and the outer frame;

wherein the width of the outer torsion connector is relatively great at a connecting portion to the inner frame, and becomes gradually smaller from the inner frame and toward the outer frame; and wherein the outer torsion connector includes an intermediate point between the first end and the second end, the width of the outer torsion connector becoming monotonically smaller from the first end to the intermediate point and monotonically greater from the intermediate point to the second end.

* * * * *